June 29, 1965  D. R. KUECK ETAL  3,192,053
PROCESS FOR CANNED MEAT
Filed Nov. 20, 1961  2 Sheets-Sheet 1
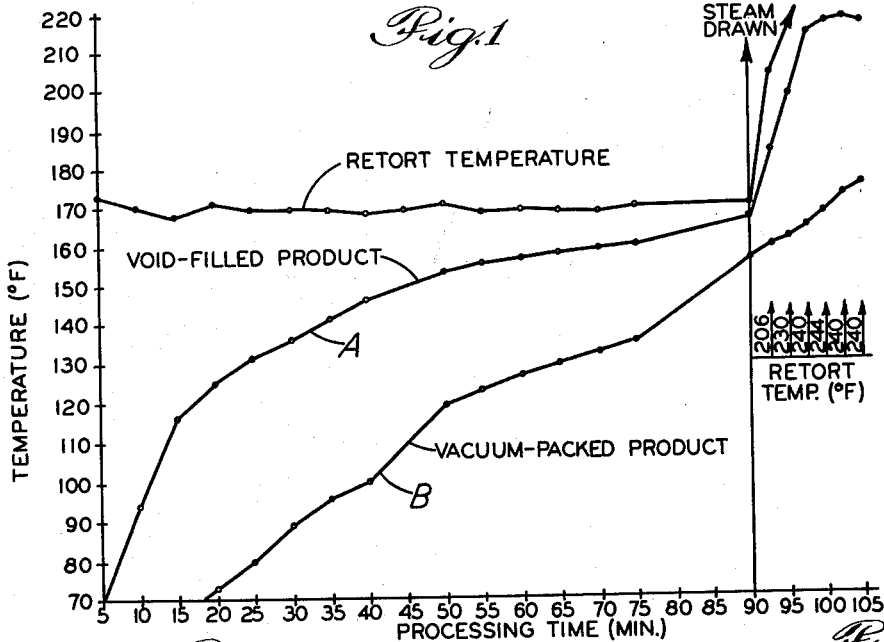
Fig. 1
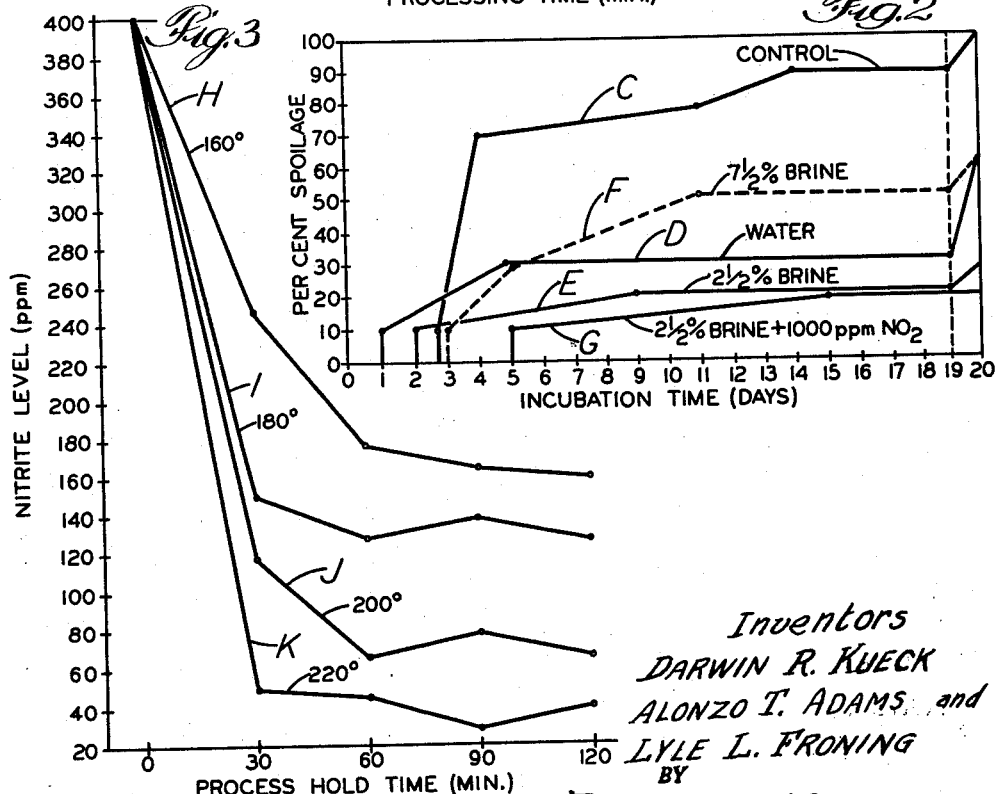
Fig. 2
Fig. 3
Inventors
DARWIN R. KUECK
ALONZO T. ADAMS, and
LYLE L. FRONING
BY
Bair, Freeman & Molinare
ATTORNEYS.

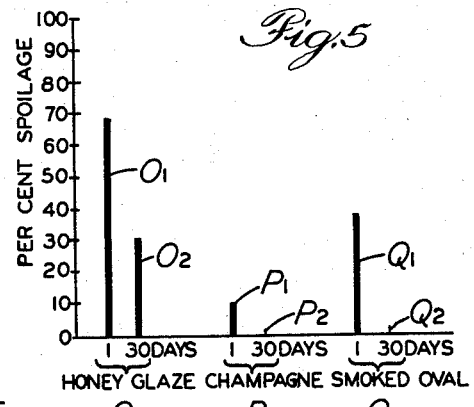
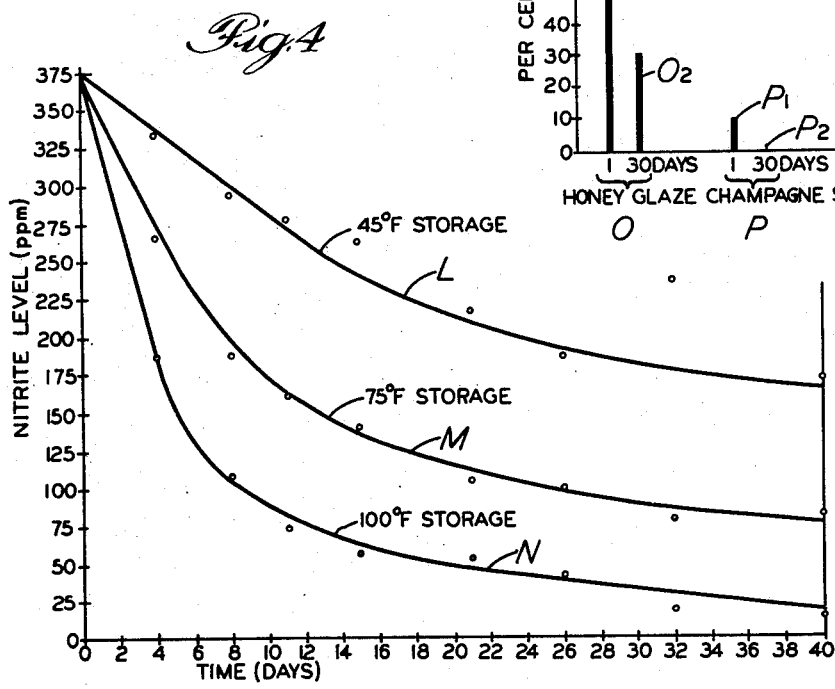
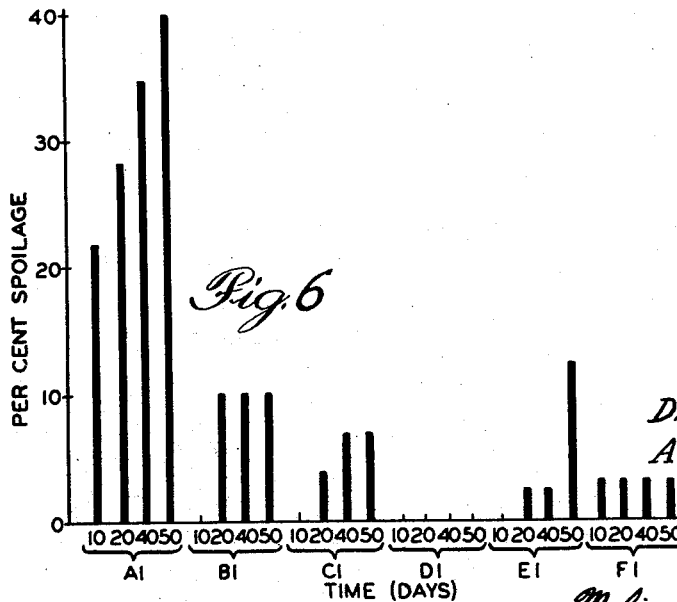

United States Patent Office 3,192,053
Patented June 29, 1965

3,192,053
PROCESS FOR CANNED MEAT
Darwin R. Kueck, Waterloo, and Alonzo T. Adams and Lyle L. Froning, Cedar Falls, Iowa, assignors to The Rath Packing Company, a corporation of Iowa
Filed Nov. 20, 1961, Ser. No. 153,307
12 Claims. (Cl. 99—187)

This invention relates in general to a process for extending the shelf life of canned meats, and more particularly to a process for producing commercially sterile canned hams or meats of comparatively large size with excellent cutting and organoleptic qualities and which require no refrigeration for storage.

Modern food processing technology incorporates a number of steps in the production of canned hams, which basically include deboning the ham, injecting a curing agent, and smoking, if desired, after which the ham is cut into portions of desired size and the portions packed in a can and heat treated. These steps, although comparatively simple by themselves, have a number of interacting effects and complex relationships which often result in defeating the end purpose of canning, i.e., the production of a high quality meat product free from spoilage during long storage without refrigeration, and especially for hams over 1½ lbs.

Muscle tissue in a healthy animal is practically sterile. In the post mortem handling, deboning and the subsequent injecting process, otherwise known as pumping, and as a result of other processing steps, bacteria are deposited both on the surface and in the interior tissue of the ham. The bacteria vary considerably in their susceptibility to heat treatment and many types form spores which can survive at elevated temperatures. Since the internal temperature of a ham may be raised only very slowly to a desired elevated temperature, it is very difficult to inhibit or destroy these bacteria unless extensive heat treatment or inhibiting agents are employed.

The curing agent generally called "pickle" usually comprises a solution of a phosphate and nitrite salt, together with nitrates and other ingredients such as sugar and salt. The solution produces the desired flavor, color and texture in the ham while the salt and nitrite salt also serve to inhibit the residual spores which survive heat treatment. However, it is extremely difficult to economically maintain the pickle solution free of bacteria as the fluid washes over the contaminated meat surface and mixes with already contaminated recirculating pickle solution.

Since the upper limit level of nitrite in the ham is set by statute, and since the nitrite becomes considerably depleted during heat treatment and subsequent storage, its effectiveness in limiting spore activity is dependent upon the comparative level of both nitrite and spores in the meat following heat treatment. The result is that if insufficient nitrite is retained after heat treatment, the remainder will be so depleted during storage that spores will germinate and the canned product will show evidence of spoilage.

Considerable heat is required to insure the thorough destruction of the microorganisms, but at the same time this is destructive of certain meat qualities. Hence, two avenues of approach in heat treatment have been chosen in the past. One is pasteurization of the ham wherein it is subjected to only moderate heat levels which destroy most microbial vegetative cells, but few bacterial spores. Such pasteurized hams are capable of only very limited shelf life and therefore must be refrigerated when stored. For example, a ham pasteurized at 165° F. in a retort to provide a temperature of 150° F. at the ham interior would be shelf stable for a period of between 3–15 days, and generally 50% of the pasteurized hams show evidence of gas production within the can after 10 days storage at 100° F. Such canned hams must therefore be refrigerated during storage.

The other avenue is the provision of a heat treatment that is so thorough as to destroy all microbial vegetative cells and most, if not all, bacterial spores and render the ham commercially sterile. During heat treatment, the meat loses a large percentage of its juices, called "purge." Therefore, as an example, if a 3 lb. canned ham is subjected to sufficient heat to render it sterile, the subsequent product has an objectionable flavor and texture and is generally friable, a condition in which it will simply crumble when being sliced or otherwise prepared for use. The result is that only small hams, for example, the 1½ lb. weight, which need not receive too severe a heat treatment (for example, 105 minutes at 240°) to insure all portions are commercially sterile, or extremely tough hams, successfully withstand the amount of heat required for commercial sterilization and are suitable for shelf stable canning.

Problems involving the preservation of canned cured meats, therefore, can be generally and broadly classified into three categories—physical, chemical and bacteriological. Since the storage stability of the finished product is the essential and primary criterion of the successful manufacture of canned meats, the factors controlling bacteriological conditions must be given the utmost consideration. These factors are the physical and chemical treatment and agents involved in canned cured meat manufacture and comprise heat to destroy the microorganisms and curing agents or additives to inhibit or destroy the microorganisms. With these concepts in mind, it will be shown how the present invention attacks the problem of producing commercially sterile hams. The term "commercially sterile" denotes a condition of shelf stability, i.e., ability to be stored for extended time periods without refrigeration rather than bacteriological purity, since it is well established that shelf stable or commercially sterile canned meat products do contain viable spores.

Investigation of spoiled canned meats, and particularly canned hams, has demonstrated the presence of bacterial cells resulting from the germination of residual spores in the final product. During heat processing the majority of bacterial cells and spores which are present on the surface of the meat mass are generally destroyed by heat, but, as noted before, heat in the amount necessary to fully destroy spores in the interior of the ham may result in the destruction of the cutting or slicing and organoleptic qualities of the ham, so that only the toughest or smallest cuts of meat can be prepared for canning in this manner.

To surmount the problem of inhibiting the residual spores surviving the heat treatment, salt and nitrite are injected into the ham as already mentioned. During storage of commercially sterile canned meat items, the salt level remains at a fairly low and constant inhibitory level. However, nitrite gradually is chemically consumed by reaction with meat protein and becomes depleted. Also during storage some spores germinate and with conditions unfavorable for the cellular proliferation, the vegetative cells are autolyzed during storage so that there is also a gradual depletion of the residual spore population. Therefore, depending on which becomes depleted first, the inhibitory nitrite level or the spore population, the canned cured meat product will remain stable or will spoil. Thus the stability of the canned cured heat processed meats during shelf storage depends essentially on three conditions: (1) the magnitude of the residual spore population after heat processing; (2) the level of the residual nitrite after heat processing; and (3) the rate of depletion of spores and nitrite after processing.

Consequently, two important considerations are required to prepare a stable shelf stored canned meat product, namely, to develop an effective method of destroying the microorganisms while simultaneously retaining the highest level of nitrite possible.

The present invention includes a number of meat processing improvements, each of which contributes to the improvement in the stability and quality of the final canned meat product. The most desirable end product is obtained by utilizing all of the several improvements, although it will be understood that the invention is not necessarily limited to the combination of all of the several improvements or processing steps.

Among the processing improvements is a change in the heat treatment applied in the canning process. This change basically involves a two-step heating process including: (1) a relatively long heating period at a relatively low temperature; (2) a relatively short heating period at a relatively high temperature. If the meat is cooled between the two steps, as is contemplated in one form of the invention, the temperature attained during the first step must be sufficient to raise the interior of the ham to 160° F.–175° F. If the meat is not cooled between the two steps, the desired minimum interior temperature of 160° F. may be attained during the second rapid heating step.

The first step of the two consists of the heating of the ham in a retort maintained between 155° and 180° F. which will yield an interior meat temperature of between 150° and 175° F. The choice of the retort and exterior temperature, and the time of application, of course, are determined by the size of the ham being processed. At the temperature of 160° F. the microbial vegetative cells and some spores will be destroyed. At this temperature a satisfactory nitrite level is maintained.

The ham is then cooked at a relatively high temperature for a relatively short period, for example, 5 to 20 minutes above 230° F. to provide surface sterilization. The upper temperature limit is governed by practical operating conditions in the retort, but the meat surface should attain a temperature of about 205°–225° F. In this short heating time, depletion of interior nitrite is held to a minimum so that its effectiveness in inhibiting spore germination and bacteriological growth during subsequent shelf storage is maintained. Likewise, the desirable qualities of the ham are retained during this short heating cycle. The average purge is less than 20% as a result of both heat processing steps. This results in a ham of excellent organoleptic and preparatory qualities. We have found that the low interior meat temperature reduces nitrite loss and should not be extensively exceeded. If the ham is cooled between the two heating steps, the second high heating step will not raise the interior meat temperature above the desired limits. The extent of cooling is set as sufficient to prevent the interior temperature from rising above the desired limit during the second rapid heating step. This may be accomplished by cooling to about 130° F. or below 60° F. It is important that this cooling not be stabilized in the temperature range of between 60° and 130° F., as this range can permit unpredictable bacterial spore germination, cellular proliferation and sporulation. When the intermediate cooling step is included in the process, it precludes the interior meat temperature from rising above the desired limit during the rapid heat cycle to thereby reduce destruction of either nitrite or meat quality.

To further enhance the effectiveness of the described 2-step heating process, the second high temperature step is followed by a process of exposing the canned meat to low temperatures. Thus storage for periods up to thirty days at temperatures between 40–50° F., and preferably between 43–47° F., allow the nitrite level to deplete at a retarded rate. In addition, this storage allows germination of residual spores under conditions unfavorable for vegetative cell growth with the result that the vegetative cells are autolyzed and the spore population is tremendously depleted so that the relative level of nitrite and spores is heavily weighted in favor of the nitrite.

Thus the principal object of the invention includes the provision of a heating procedure to a canned meat product which will provide a maximum of sterilization consistent with the maintenance of meat quality and the minimum depletion of bacterial growth inhibiting nitrite in the meat.

A further object of the invention is the provision of a temporary storage procedure for a canned meat product which holds the depletion of bacterial growth inhibiting nitrite to a minimum while simultaneously depleting the residual spore population, whereafter the meat may be safely stored at room temperature.

The preceding discussion has dealt with the principal techniques whereby the objects of the present invention are accomplished. However, it should be understood that the efficacy of such techniques may be enhanced by a number of other steps.

Thus the curing agent which is injected into the meat for the purpose of controlling its color and texture and for inhibiting bacterial growth contains a number of substances. These substances include nitrite, sodium chloride, or other materials which serve to inhibit bacterial growth, together with nitrates and sugar. In keeping with the purpose of the invention in eliminating conditions favoring bacterial growth, another purpose or object of the invention is the formulation of a curing solution which will be more effective in preventing bacterial growth. Several steps are effective for accomplishing this purpose. These include the elimination of nitrates and sugar from the curing agent and/or the substitution of lactose for the sucrose.

The invention also contemplates certain modifications in the usual arrangement for packing the ham. These include the complete evacuation of air from the can and the filling of the can to reduce or prevent voids. This insures conditions favorable to efficient heat transfer during heat treatment, and therefore enhances spore destruction.

The above and other objects of the invention will become apparent on examination of the following specification, claims and drawings wherein:

FIGURE 1 is a graph illustrating the improved heat transfer efficiency between the retort and ham surface when the voids in the can are filled;

FIGURE 2 is a graph illustrating the effectiveness of various void filling solutions on can swelling;

FIGURE 3 is a graph illustrating the effect of heat on the nitrite level;

FIGURE 4 is a graph illustrating the effect of cool storage on the nitrate level;

FIGURE 5 illustrates relative spoilage rates between hams having different storage conditions;

FIGURE 6 illustrates the effect of different curing mixtures on spoilage rates.

The invention may incorporate the usual preliminary steps in the production of a commercially sterile or shelf stable ham. Thus the post mortem deboning of the ham is generally followed by curing and smoking. The curing comprises pumping of green skinned and fatted hams with a conventional pump pickle containing salt, sodium nitrate, sodium nitrite, sugar and a phosphate, and curing for one to three days. After the cure, the hams may be smoked, and chilled.

After the chilling, the hams are cut into 3 lb. portions, for example, and packed in #1 oval tins of approximately 3 in. depth and, if desired, a flavoring medium and/or gelatin is added. The tins or cans are then vacuum pressed and closed at a maximum vacuum which preferably should not be less than 26 in. of mercury. The just described steps, with the exception of the high degree of vacuum, employ largely conventional techniques such as used in the manufacture of canned pasteurized hams of a 3 pound variety or commercially sterile hams of the 1½ pound or larger variety.

The can containing the ham is then placed in the pressurized retort and hot water allowed to fill the retort surrounding the can. The ham is then cooked for approximately 2–2½ hours in water approaching 165° F., but not exceeding 180° F., to provide an internal temperature of preferably between 160°–165° F., and not exceeding 175° F. The cooking time and exterior temperature necessary to achieve an internal temperature of 160°–175° F. is of course dependent on the ham size.

The hot water is then drained and steam injected into the retort at 235°–240° F. to provide a flash heat. Between the two heating steps the ham may be cooled to a temperature of approximately 130° F. or below 60° F. but not to a temperature within this range which favors bacterial growth. The temperature in the retort is then held at 235° F. to 245° F. for 15 minutes. Next, the retort is filled with cold water and the ham is cooled while maintaining the pressure, whereafter the water is drained. The can is then removed from the retort and transferred to a 43–47° F. cooler and held there for 30 days prior to shipment.

The results of this process have been unique. Thus, in conformance with the Government test standards for commercialy sterile ham, 3 pound hams produced by the above process and excluding the step of storing at 43–47° F. have been incubated at 98° F. for 10 days without the development of swollen tins, and bacterial counts on test samples indicate that the total bacteria, as well as aerobic and anaerobic spores are of the same magnitude as those found in shelf stable, commercially sterile, non-incubated hams processed under present Government approved methods.

More severe tests, as, for example, incubation at 98° F. for 60 days of hams subjected to the two step heating process but not the cool storage at 43°–47° F. showed less than 2% spoilage. In another test where hams were treated 30 days in the cooler at 43°–47° F. following the described heating process and incubated at 98° F., no spoilage was evident after 90 days.

In the case of hams stored at room temperature of 70° F. to 75° F. immediately after the described two step heating or cooking process for a period of 270 days, no can swelling was observed.

There are a number of reasons ascribed to the successful results achieved. First, the high vacuum enables a reduction in the can voids from an average of about 45 cc. to about 30 cc. in a 3 pound canned ham. Responsive to the first heating step, the cook out or purge juices will cause extensive filling of the void space. The result is to provide excellent heat transfer between the retort and the ham so that on the second rapid heating step at 235° F. to 240° F., maximum heat transfer efficiency occurs. With the improved heat transfer efficiency achieved, the surface temperature of the ham reaches highly elevated values within a short time to effectively destroy the major part of the spore population which is generally present on the meat surface, while preventing excessive nitrite depletion, especially in the interior.

The two step cooking process described above therefore considerably enhances the shelf stability of canned hams. To produce even more superior results, the additional step of introducing storage under cooled or chilled conditions is provided. Further, it has been found possible by this method to provide a ham far superior in taste and other qualities to the ordinary commercially sterile ham prepared by simply cooking at elevated temperatures. Thus the present method retains the desirable ham qualities so that tender hams in, for example, the 3 pound size which would normally be treated only by a pasteurizing process and which would require storage under refrigeration, may now also be canned for shelf storage under the above procedure without substantial loss of quality. The comparative quality between shelf stable or commercially sterile 3 lb. hams produced in accordance with former practices and 3 lb. shelf stable hams produced in accordance with the invention is indicated by the fact that purge values for the former are about 33% while in the present process, the average surge, as indicated by tests, is about 17%. Thus the high purge values for the former indicate the poor organoleptic and preparatory qualities thereof, while the invention produces hams having organoleptic qualities comparing well with pasteurized hams which have an average purge value of about 12%.

As already indicated, the purge produced as a result of the first heating step is believed to contribute considerably to the effectiveness of the second heating step. The reason for this is believed to lie in the more effective and uniform heat transfer provided from the can to the meat, when the purge juices reduce the voids in the can. Thus reducing the voided volume of the can enhances the effectiveness of the heating steps. This may practically be done by providing a smaller can which more closely conforms to the dimension and/or configuration of the meat cut. Other void elimination steps include the filling of the can with fluid media such as water, brine, pickle, nitrite solution, gelatin slurry and/or sauces.

The effect of improved packing was confirmed by a series of experiments results of which are illustrated in the graphs in FIGURES 1 and 2. FIGURE 1 represents the comparative heat transfer rates between a sample of canned meat indicated at A having the void between can and meat filled with water and the sample of canned meat indicated at B in which the voids were not filled. Both samples were processed for 90 minutes at 170° F. and steam retorted for 15 minutes at 240° F. The retort temperature is also shown in FIGURE 1. It will be noted that the water containing or void filled sample A reaches a higher temperature within a much shorter time interval than the unfilled sample B. Thus, the meat surface of the void filled product A reached a temperature of 150° F. within 50 minutes. In the vacuum packed product or unfilled sample B this temperature is not reached until 90 minutes. Further, in the vacuum packed product or unfilled sample B, the temperature at the surface where most bacterial colonies are located, did not rise to 180°, which is considered a lethal temperature for microbial spores. However, in the void filled product, sample A, the temperature reached 200° F. after only 5 minutes steam retorting, and reached 220° F. after only 12½ minutes of steam retorting, which is considered lethal for most bacterial spores.

This heat transfer efficiency is obtained by the void filling technique typified by FIGURE 1 and is utilized to derive significantly lower spoilage rates. Thus, the comparative rates of can swelling between one group of 3 pound canned hams treated with the mere addition of gelatin to the can while another group was treated by the addition of 1:5 dilution pump pickle and gelatin, were found to be significantly different. All were heat processed without the second or high temperature flash heat treatment so that the samples were no more stable than conventionally processed pasteurized hams. After heat processing the samples were incubated at 100° F. for 14 days and it was found that the unfilled samples showed 75% can swelling compared with 25% for the void filled samples.

The results of a second test of a similar nature are indicated in FIGURE 2. Five lots of 1½ pound samples were prepared with various void fillers including gelatin. The respective lots marked C–G in FIGURE 2 were treated as follows:

C—no void fill solution
B—tap water for void fill
E—2½% brine for void fill
F—7½% brine for void fill
G—2½% brine and 1000 p.p.m. NO₂ for void fill The samples were then vacuum sealed and cooked for 1½ hours at 155° F. They were thereafter incubated at 100° F. for 30 days.

As will be seen in FIGURE 2, the cans without any void filling indicated at C showed about 70% can swelling after less than 5 days of incubation, while at the other extreme the cans filled with 2½% brine plus 1000 p.p.m. $NO_2$ showed less than 20% can swelling after 20 days. In all cases, the effect of filling the void between the meat and the can was to significantly lessen the extent of can swelling during storage. However, it will be noted that the type of fill aids considerably in retarding or preventing bacterial manifestations. Thus, as illustrated at G in FIGURE 2, a void fill solution containing nitrite is able to compensate to some extent for the reduction in the nitrite level within the meat during processing and thereby inhibit bacterial spores that survive the heat treatment.

Returning now to the effects of the heat processing steps used in this invention, it will be recalled that in the preceding discussion it was mentioned that nitrite levels are reduced by heating as is the spore population. Thus in sterile harsh cooked items it may be presumed that both spores and nitrite are reduced to 0 level, while in pasteurized mild cooked items some spores and nitrite remain and the inhibitory effect of nitrite determines the product stability.

Since it is desirable to produce a mild heat treated product, it was necessary to provide a heat treatment, which will retain the best meat qualities while reducing the spore population and maintain a high inhibitory nitrite level. It therefore was necessary to ascertain the effect of heat on the nitrite level. The graph shown in FIGURE 3 illustrates the extent of nitrite depletion for various degrees of heat and time. Thus meat prepared with a cure of 3½% NaCl, 500 p.p.m. nitrite and 500 p.p.m. nitrate was packed in separate cans and the different cans heat processed or heat treated for 30, 60, 90 and 120 minutes, respectively, at each of the following temperatures: 160°, 180°, 200° and 220° F. In FIGURE 3 the nitrite level for the samples held at temperatures of 160° for 30, 60, 90 and 120 minutes is shown at H; the nitrite level for the 180° test samples at I; the 200° test samples at J; and the 220° samples at K. This graph shows the nitrite level was most affected by the highest process temperature. Further experiments of the above type demonstrated again that the terminal level of nitrite depends essentially on the processing temperature with low terminal temperatures yielding high nitrite levels and high terminal temperatures yielding low nitrite levels. The terminal temperature of course is the temperature which the meat finally reaches, when exposed to a particular retort temperature for a period of time. Thus, in a heat processing cycle of 160° F. the rate of nitrite depletion is held to a minimum while the subsequent high heat for a short time is largely effective to produce surface sterilization of the meat (which is the most highly contaminated region), while preventing interior nitrite depletion.

The rate and extent of nitrite depletion is also controlled by the post processing storage temperature. This is illustrated by the graph in FIGURE 4. The basis for the experiments, results of which are illustrated in FIGURE 4, is the theory that spores would be exposed to higher nitrite levels as a result of the reduced rate of protein denaturation at low storage temperatures as the reaction between nitrite and protein would then be considerably retarded. FIGURE 4 shows the comparative level of nitrite depletion in three groups of canned meat. All groups were given a 2½% salt and 500 p.p.m. nitrite cure and cooked for 90 min. at 160° F. One group L was then incubated or stored at 45° F.; group M was stored at 75° F.; and group N at 100° F. Samples from each batch were removed and tested at 4 to 7 day intervals during a 40 day storage period. The graph clearly indicates that nitrite loss continues after heat processing with nitrite level after 10 days in group L reduced from 400 p.p.m. to about 275 p.p.m., group M to about 175 p.p.m. and group N to about 75 p.p.m. Storage at reduced temperatures, it will be seen, results in approximately a three to fourfold improvement in terminal nitrite levels. It will be noted that in each case the nitrite tends to be depleted asymptotically which is primarily a function of the temperature at which storage takes place and that after a 10–15 day storage period at any temperature, the rate of nitrite depletion lessens considerably. These data support the contention that low temperature post-processing storage of canned hams favors canned ham stability by prolonging exposure of residual bacterial spores to the lethal effects of higher nitrite levels.

To further illustrate the effectiveness of the prolonged storage under cool conditions, 3 groups of conventionally pasteurized canned hams were subjected to 30 days' storage at 45° F. These hams were referred to as "honey glaze," "champagne" and "smoked," in accordance with the flavoring treatment and marked O, P and Q, respectively. One lot from each group was given an overnight chill and then incubated at 98° for 20 days and the percent of spoilage in this group is indicated at O1, P1 and Q1, respectively, in FIGURE 5. Another lot from each group was given 30 days' storage at 45° F. and then incubated at 98° F. for 20 days. The percent of can swelling for each of these groups is shown at O2, P2 and Q2, respectively. The comparative percent spoilage between the long chill versus the overnight chill for each group is illustrated in FIGURE 5.

A number of experiments were conducted in which different curing mixtures or agents were utilized. Thus, in FIGURE 6 the results of a test in which meat subjected to curing mixtures containing additives such as nitrate and sugar are compared with mixtures lacking these additives. It was theorized that nitrate and sugar could have a significant effect in promoting bacterial growth and that their omission could extend storage life of canned hams. Thus meat containing the various mixtures was subjected to a heat treatment at 155° F. temperature for 1½ hours and then incubated. The percent of can swells is shown after 10, 20, 40 and 50 day incubation. This test confirmed the theorized effect of sugar and nitrate by comparison of spoilage rates in a series of sample groups indicated at A1–F1 in FIGURE 6, containing the following curing mixtures:

Basic mixture                                              Additions
    A1=salt-nitrite _____ Nitrate-sugar.
    B1=salt-nitrite _____ Sugar.
    C1=salt-nitrite _____ None.
    D1=salt-nitrite _____ Lactose.
    E1=salt-nitrite _____ Nitrate-lactose.
    F1=salt-nitrite _____ Nitrate.

In FIGURE 6, the percent of spoilage for the mixtures in group A1 containing the basic mixture with nitrate plus sugar is significantly higher than in any other. In the sample group D1 containing the basic mixture and lactose no significant spoilage was observed, while in group B1 containing the basic mixture and sucrose shows considerable spoilage after only 20 days' incubation. Lactose, a very poor assimilatory substrate for Bacillus and Clostridium organisms, is used for its sweetening effects and is Government sanctioned. It will be appreciated of course, that other sweetening agents can be used in place of lactose, such as sodium cyclamate (Sucaryl) or other sweetening agents which are not assimilated by spore forming bacteria.

Comparison of sample group A1 with B1 shows the marked reduction in can swelling resulting from omission of nitrate. As indicated in sample groups C1 and D1 the omission of both nitrate and sugar from the curing mixture results in a more stable finished product.

It is believed clear, therefore, that filling the can voids and the elimination of nitrate together with sugar from the curing agents also result in significantly lower rates of spoilage, while the post processing step of storing at low temperature itself provides considerable reduction in spoilage rates.

While there have been shown and described particular embodiments of this invention, it will be obvious to those skilled in the art that various changes and modifications may be made therein without departing from the invention and, therefore, it is intended in the appended claims to cover all such modifications and changes as fall within the true spirit and scope of the invention.

What we claim as new, and desire to secure by Letters Patent of the United States is:

1. A continuous process for producing a canned stable meat product of a commercially sterile type which can be stored without refrigeration, wherein the meat product has been cured and placed in a vacuum sealed can, said process comprising the steps of initially heating the canned meat product to a temperature of about 150°–175° F. sufficient for destroying substantially all of the microbial vegetative cells and some of the spores in the meat product while yielding purge juices of less than about 20%, and thereafter flash-heating said canned meat product for less than about 20 minutes in order to provide a meat surface temperature of about 205–225° F. so as to destroy the majority of microbial spores on the surface of said meat product.

2. The process of claim 1 wherein the flash-heating is at a temperature of about 230°–245° F.

3. A continuous process for producing a canned stable meat product of a commercially sterile type which can be stored without refrigeration, wherein the meat product has been cured and vacuum sealed in a can, said process comprising the steps of initially heating the canned meat product to a temperature of about 150°–175° F. sufficient for destroying substantially all of the microbial vegetative cells and some of the spores in the meat product while yielding purge juices of less than about 20%, cooling said meat product to a temperature outside the range of 60°–130° F. in order that subsequent heating does not excessively raise the interior temperature thereof, and thereafter flash-heating said meat for less than 20 minutes in order to provide a meat surface temperature of about 205–225° F. in order to destroy the majority of microbial spores on the surface of said meat product.

4. The process of claim 3 wherein said cooling lowers the temperature of the meat product to not below about 130° F.

5. The process of claim 3 wherein said cooling lowers the temperature of the meat product to below about 60° F.

6. A continuous process for producing a canned stable meat product of a commercially sterile type which is capable of being stored without refrigeration, wherein the meat product has been cured with a solution containing nitrites and thereafter vacuum sealed in a can, said process comprising the steps of initially heating said canned meat product to a temperature of about 150°–175° F. sufficient for destroying substantially all of the microbial vegetative cells and some of the spores in said meat product, while yielding purge juices of less than about 20%, thereafter flash-heating said meat product for less than about 20 minutes to obtain a surface meat temperature of about 205–225° F. in order to destroy the majority of microbial spores on the surface of said meat product, and then storing said canned meat product at a temperature of about 40–50° F. so as to allow the nitrite level in said meat product to be depleted at a retarded rate whereby the nitrites are available for destroying the spore population in said meat product.

7. The process of claim 6 wherein the meat product is stored at 40–50° F. for a period of 15–30 days.

8. A continuous process for producing a canned stable meat product of a commercially sterile type which is capable of being stored without refrigeration, wherein the meat is cured with a solution containing nitrites and thereafter placed in a vacuum sealed can, said process comprising the steps of initially heating the meat product to raise the interior of the meat product to a temperature of 150–175° F. so as to destroy substantially all of the microbial vegetative cells and some of the spores in said meat product, while yielding purge juices less than about 20%, cooling said meat product to a temperature outside the range of 60°–130° F. so that subsequent heating does not excessively raise the interior temperature thereof, and thereafter flash heating said meat product in order to provide a meat surface temperature of about 205–225° F. in order to destroy the majority of microbial spores on the surface of said meat, and cooling said canned meat product for a period of about 15–30 days at a temperature of about 40–50° F. in order to retard the depletion of nitrites in said meat product whereby the nitrites are available for destroying the spore population in said meat product.

9. A continuous process for producing a canned stable meat product of a commercially sterile type which is capable of being stored without refrigeration, said process comprising the steps of curing said meat product, packing said meat product in a container, filling the voids in said container, applying a vacuum of at least 26" of mercury, sealing said can, heating said can in retort to a temperature of about 155–180° F. for a period of time sufficient to yield an interior meat temperature of at least about 160° F. so as to expose microbial spores and cells to lethal temperatures, and then flash-heating said canned meat product for a period less than about 20 minutes to provide a meat surface temperature of about 205–225° F. whereby the majority of the microbial spores on the surface of said meat are destroyed.

10. The process of claim 9 wherein said meat product is ham and said pickling is performed with a solution containing nitrites and lactose.

11. A continuous process for producing a canned stable ham of a commercially sterile type which is capable of being stored without refrigeration, comprising the steps of curing said ham with a solution containing nitrites and lactose, packing said ham in a container, filling the voids in said container, applying a vacuum of at least 26" of mercury to said ham, sealing said can, heating said canned ham at a temperature ranging from about 155–180° F. in order to provide an interior ham temperature of at least about 160° F. whereby microbial spores and cells are exposed to lethal temperatures, cooling said canned ham to a temperature outside the range of 60°–130° F. and sufficiently low so that subsequent heating will not excessively heat the interior of said ham, thereafter heating said ham to a temperature of about 230–245° F. in order to provide a ham surface temperature of about 205–225° F. in order to substantially destroy the majority of microbial spores on the surface of said ham, and storing said canned meat product at a temperature of about 40–50° F. for about 15 to 30 days in order to reduce the rate of nitrite depletion so that the nitrites are available for destroying the spore population in said meat product.

12. A continuous process for producing a canned stable meat product of a commercially sterile type which is capable of being stored without refrigeration, wherein the meat product has been cured with a solution containing nitrites and thereafter vacuum sealed in a can, said process comprising the steps of initially heating said canned meat product to a temperature of about 150°–175° F. sufficient for destroying substantially all of the microbial vegetative cells and some of the spores in said meat product, thereafter flash-heating said meat product to obtain a surface meat temperature of about 205°–225° F. in order to destroy the majority of microbial spores on the surface of said meat product, and then storing said canned meat product at a temperature of about 40°–50°

F. so as to allow the nitrite level in said meat product to be depleted at a retarded rate whereby the nitrites are available for destroying the spore population in said meat product.

References Cited by the Examiner

UNITED STATES PATENTS

| | | | |
|---|---|---|---|
| 2,297,962 | 10/42 | Jensen et al. | 99—187 |
| 2,305,480 | 12/42 | Komarik | 99—187 |

OTHER REFERENCES

"The Science of Meat and Meat Products," 1960, pages 169–170 and 288–295, distributed by Reinhold Publishing Co., New York, N.Y.

A. LOUIS MONACELL, *Primary Examiner.*

ABRAHAM H. WINKELSTEIN, *Examiner.*